(12) United States Patent
Lehavi et al.

(10) Patent No.: US 9,911,188 B1
(45) Date of Patent: Mar. 6, 2018

(54) HIGHLY ACCURATE ALIGNMENT BETWEEN THREE DIMENSIONAL OBJECTS

(71) Applicant: Yowza LTD., Tel Aviv (IL)

(72) Inventors: David Lehavi, Haifa (IL); Shir Peled, Pardes Hanna-Karkur (IL)

(73) Assignee: YOWZA LTD., Tel Aviv (IL)

( * ) Notice: Subject to any disclaimer, the term of this patent is extended or adjusted under 35 U.S.C. 154(b) by 29 days.

(21) Appl. No.: 15/097,300

(22) Filed: Apr. 13, 2016

(51) Int. Cl.
*G06T 7/00* (2017.01)

(52) U.S. Cl.
CPC ........ *G06T 7/0034* (2013.01); *G06T 2200/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,821,943 A * | 10/1998 | Shashua | ................. | G06T 15/20 345/419 |
| 6,130,958 A * | 10/2000 | Rohler | ................. | A61B 5/0073 250/339.06 |
| 9,508,150 B1 * | 11/2016 | Lehavi | ................. | G06K 9/46 |
| 2003/0161504 A1 * | 8/2003 | Inoue | ................. | G06K 9/00221 382/115 |
| 2009/0303507 A1 * | 12/2009 | Abeloe | ................. | B29C 67/0088 358/1.9 |
| 2011/0064302 A1 * | 3/2011 | Ma | ................. | G06K 9/00275 382/159 |
| 2012/0314230 A1 * | 12/2012 | Conlon | ................. | H04N 1/00347 358/1.9 |
| 2012/0316407 A1 * | 12/2012 | Anthony | ................. | A61B 8/4209 600/301 |
| 2016/0196480 A1 * | 7/2016 | Heifets | ................. | G06F 19/16 382/158 |

* cited by examiner

*Primary Examiner* — Tsung-Yin Tsai
(74) *Attorney, Agent, or Firm* — Reches Patents

(57) ABSTRACT

A method, comprising receiving or calculating first information about a representation of a first object; receiving or calculating second information about a representation of a second object; calculating, based on the first information, an orbit-responsive representation of the first object; calculating, based on the second information, multiple intermediate representations of the second object; wherein each intermediate representation is orbit responsive and transformation responsive; wherein different intermediate representations correspond to different transformations of the octahedral group; and determining a misalignment between a preliminary representation of the first object and a preliminary representation of the second object based on a relationship between the first information and each of the intermediate representations.

15 Claims, 9 Drawing Sheets

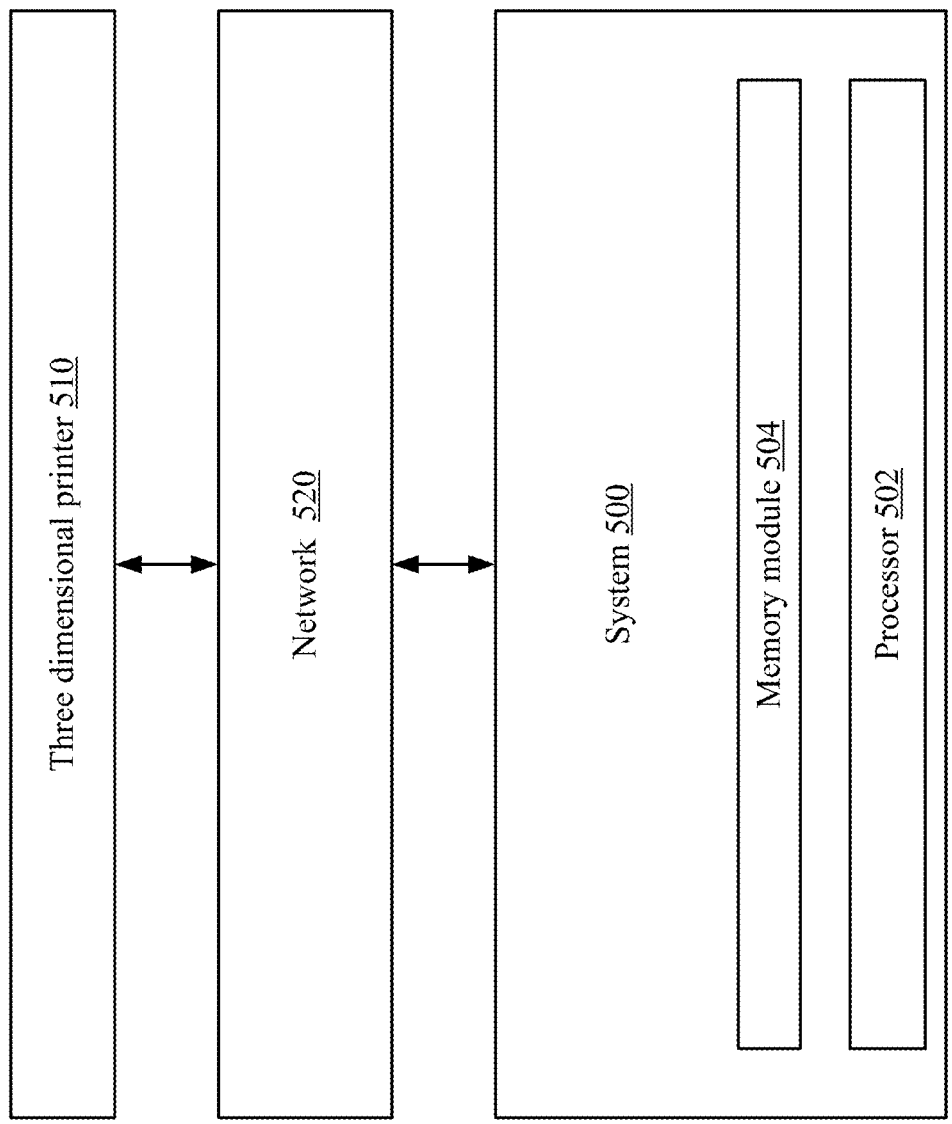

HIGHLY ACCURATE ALIGNMENT BETWEEN THREE DIMENSIONAL OBJECTS

RELATED APPLICATIONS

Principal component analysis (PCA) can be used to align a representation of an object to a canonical coordinate system.

PCA is highly sensitive to the relationships between the dimensions (height, width, depth) of an object. Changing these relationships may dramatically change the PCA aligned representation of the object.

There is a growing need to provide a robust and efficient method for finding a best alignment between representations of three dimensional objects.

SUMMARY

There are provided method, computer readable media and a computer as specified in the specification and/or the claims.

According to an embodiment of the invention there may be provided a method that may include receiving or calculating first information about a representation of a first object; receiving or calculating second information about a representation of a second object; calculating, based on the first information, an orbit-responsive representation of the first object; calculating, based on the second information, multiple intermediate representations of the second object; wherein each intermediate representation may be orbit responsive and transformation responsive; wherein different intermediate representations correspond to different transformations of the octahedral group; and determining a misalignment between a preliminary representation of the first object and a preliminary representation of the second object based on a relationship between the first information and each of the intermediate representations.

The method may include calculating, based on the second information, an orbit-responsive representation of the second object; wherein the multiple intermediate representations are calculated based on the orbit-responsive representation of the second object.

Each intermediate representation may include multiple repetitions of bits that are positioned at a same position within different groups of the orbit-responsive representation of the second object; and wherein different intermediate representations include bits that were positioned at different locations of the orbit-responsive representation of the second object.

The determining of the misalignment between the preliminary representation of the first object and the preliminary representation of the second object may include calculating multiple intermediate results by performing a logical AND operation between the orbit-responsive representation of the first object and each one of the intermediate representations; wherein each intermediate result may include multiple intermediate result groups; for each position counting a number of set bits that are positioned at the position, within each intermediate result group to provide multiple counts: adding different counts that are related to same spatial relationships between the initial representations of the first object and the second object to provide different sums; and finding a highest sum of the different sums; wherein the highest sum defines the misalignment between the preliminary representations of the first and second objects.

The counting of the number of the set bits that are positioned at the position may include applying an iterative process that may include repetitively converting vectors to odd vectors and even vectors using zero padding; and adding sets of even vectors and sets of odd vectors.

The first information may be about a principal component analysis (PCA) aligned representation of the first object and wherein the second information may be about a PCA aligned representation of the second object.

According to an embodiment of the invention there may be provided a non-transitory computer readable medium may store instructions that once executed by a computer may cause the computer to execute the steps of receiving or calculating first information about a representation of a first object; receiving or calculating second information about a representation of a second object; calculating, based on the first information, an orbit-responsive representation of the first object; calculating, based on the second information, multiple intermediate representations of the second object; wherein each intermediate representation may be orbit responsive and transformation responsive; wherein different intermediate representations correspond to different transformations of the octahedral group; and determining a misalignment between a preliminary representation of the first object and a preliminary representation of the second object based on a relationship between the first information and each of the intermediate representations.

The non-transitory computer readable medium may store instructions for calculating, based on the second information, an orbit-responsive representation of the second object; wherein the multiple intermediate representations are calculated based on the orbit-responsive representation of the second object.

The determining of the misalignment between the preliminary representation of the first object and the preliminary representation of the second object may include calculating multiple intermediate results by performing a logical AND operation between the orbit-responsive representation of the first object and each one of the intermediate representations; wherein each intermediate result may include multiple intermediate result groups; for each position counting a number of set bits that are positioned at the position, within each intermediate result group to provide multiple counts: adding different counts that are related to same spatial relationships between the initial representations of the first object and the second object to provide different sums; and finding a highest sum of the different sums; wherein the highest sum defines the misalignment between the preliminary representations of the first and second objects.

The counting of the number of the set bits that are positioned at the position may include applying an iterative process that may include repetitively converting vectors to odd vectors and even vectors using zero padding; and adding sets of even vectors and sets of odd vectors.

According to an embodiment of the invention there may be provided a computer that may include a memory unit that may be configured to store first information about a representation of a first object and to store second information about a representation of a second object; and a processor that may be configured to calculate, based on the first information, an orbit-responsive representation of the first object; calculate, based on the second information, multiple intermediate representations of the second object; wherein each intermediate representation may be orbit responsive and transformation responsive; wherein different intermediate representations correspond to different transformations of the octahedral group; and determine a misalignment between a preliminary representation of the first object and a preliminary representation of the second object based on a relationship between the first information and each of the intermediate representations.

The processor may be configured to calculate, based on the second information, an orbit-responsive representation of the second object; wherein the multiple intermediate representations are calculated based on the orbit-responsive representation of the second object.

Each intermediate representation may include multiple repetitions of bits that are positioned at a same position within different groups of the orbit-responsive representation of the second object; and wherein different intermediate representations include bits that were positioned at different locations of the orbit-responsive representation of the second object.

The processor may be configured to determine the misalignment between the preliminary representation of the first object and the preliminary representation of the second object by: calculating multiple intermediate results by performing a logical AND operation between the orbit-responsive representation of the first object and each one of the intermediate representations; wherein each intermediate result may include multiple intermediate result groups; for each position counting a number of set bits that are positioned at the position, within each intermediate result group to provide multiple counts: adding different counts that are related to same spatial relationships between the initial representations of the first object and the second object to provide different sums; and finding a highest sum of the different sums; wherein the highest sum defines the misalignment between the preliminary representations of the first and second objects.

The processor may be configured to the count the number of the set bits that are positioned at the position by applying an iterative process that may include repetitively converting vectors to odd vectors and even vectors using zero padding; and adding sets of even vectors and sets of odd vectors.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 9 illustrates a system according to an embodiment of the invention.

DETAILED DESCRIPTION OF THE DRAWINGS

Figure 1:
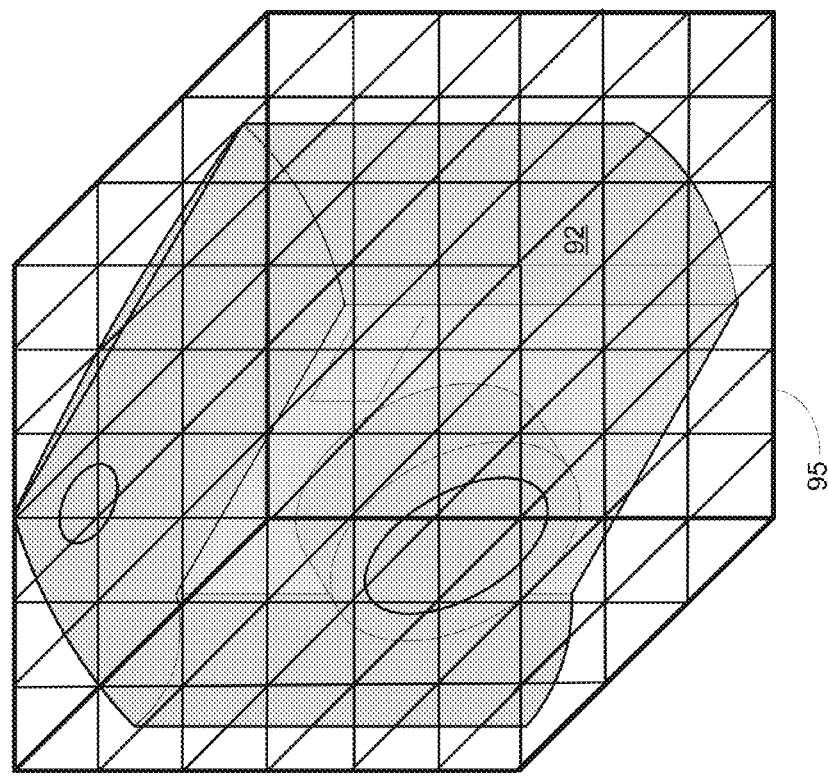
FIG. 1 illustrates a preliminary representation of an object and a PCA aligned representation of an object according to an embodiment of the invention.
Figure 1:
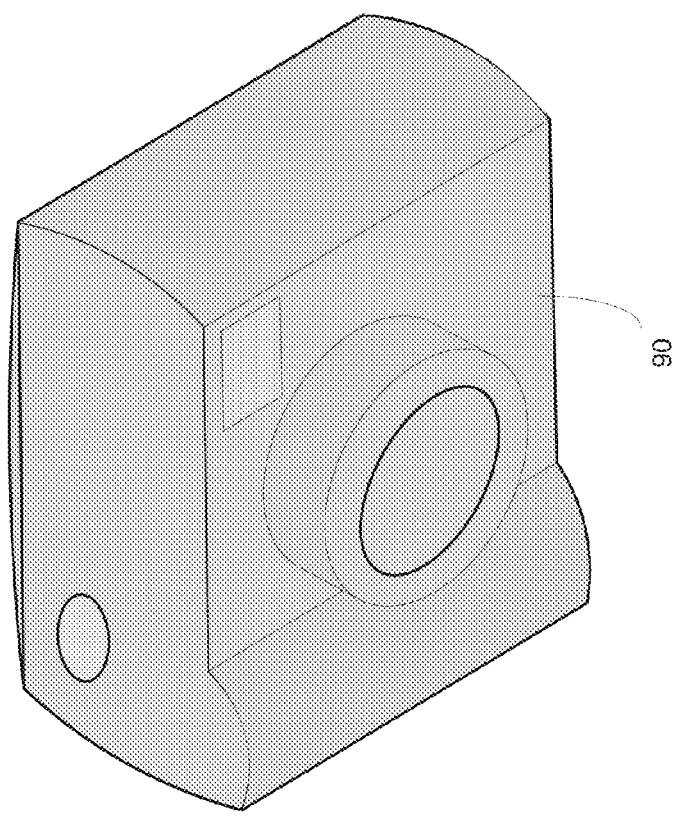

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

There is provided a computer, a method and a computer readable product for efficiently finding a best alignment between representations of three dimensional objects. The best alignment is selected out of multiple possible alignments that correspond to forty eight transforms of the octahedral group.

The octahedral group includes forty eight transformations. In order to find the best alignment between first and second objects there is a need to evaluate the spatial relationships between (i) the first object after being transformed by each one of the forty eight different transformations and (ii) the second object after being transformed by each one of the forty eight different transformations—over there is a need to evaluate 48×48=2304 combinations.

In the following description is assumed that the alignment process states by receiving or calculating a PCA aligned representation of each object. This is merely an option. The representations of the object may be aligned to principle axis according to any alignment scheme that differs from PCA and/or may not be aligned to any coordinate axis.

FIG. 1 illustrates a preliminary representation 90 of a first object that is a camera and a PCA aligned representation 92 of the first object.

The PCA aligned representation 92 is virtually positioned within a three dimensional grid 95.

First information about the PCA aligned representation 92 is generated by determining which bins of the three dimensional grid 95 are at least partially filled by a part of the PCA aligned representation 92 and which bins of the three dimensional grid 95 are not filled by any part of the PCA aligned representation 92. For example—the eight bins that are positioned at the corners of the three dimensional grid 95 are empty and may be represented by zero (or reset) bits.

FIG. 1 illustrates the first information as a vector A 10 that includes K bits A(1)-A(K).

The first information may be converted to an orbit—responsive representation of the first object. In FIG. 1 there is a vector C 20 that includes multiple (L) groups of bits C1 20(1)-C(L) 20(L). L equals K divided by 48.

Each group of vector C includes values of bins that belong to the same orbit under the octahedral group. Different groups include bins that belong to different orbits under the octahedral group.

For example—assuming that a certain group includes a corner bin of the three dimensional grid 95. When applying on the corner bin each one of the transformations of the octahedral group (to calculate the orbit of the bin) then other corner bins of the three dimensional grid 95 will be found—so that the certain group includes only the eight corner bins of the three dimensional grid 95.

Each group of C (C1 20(1)-C(L) 20(L)) includes up to forty eight members.

A second object may be represented by second information about a PCA aligned representation of a second object.

Figure 2:
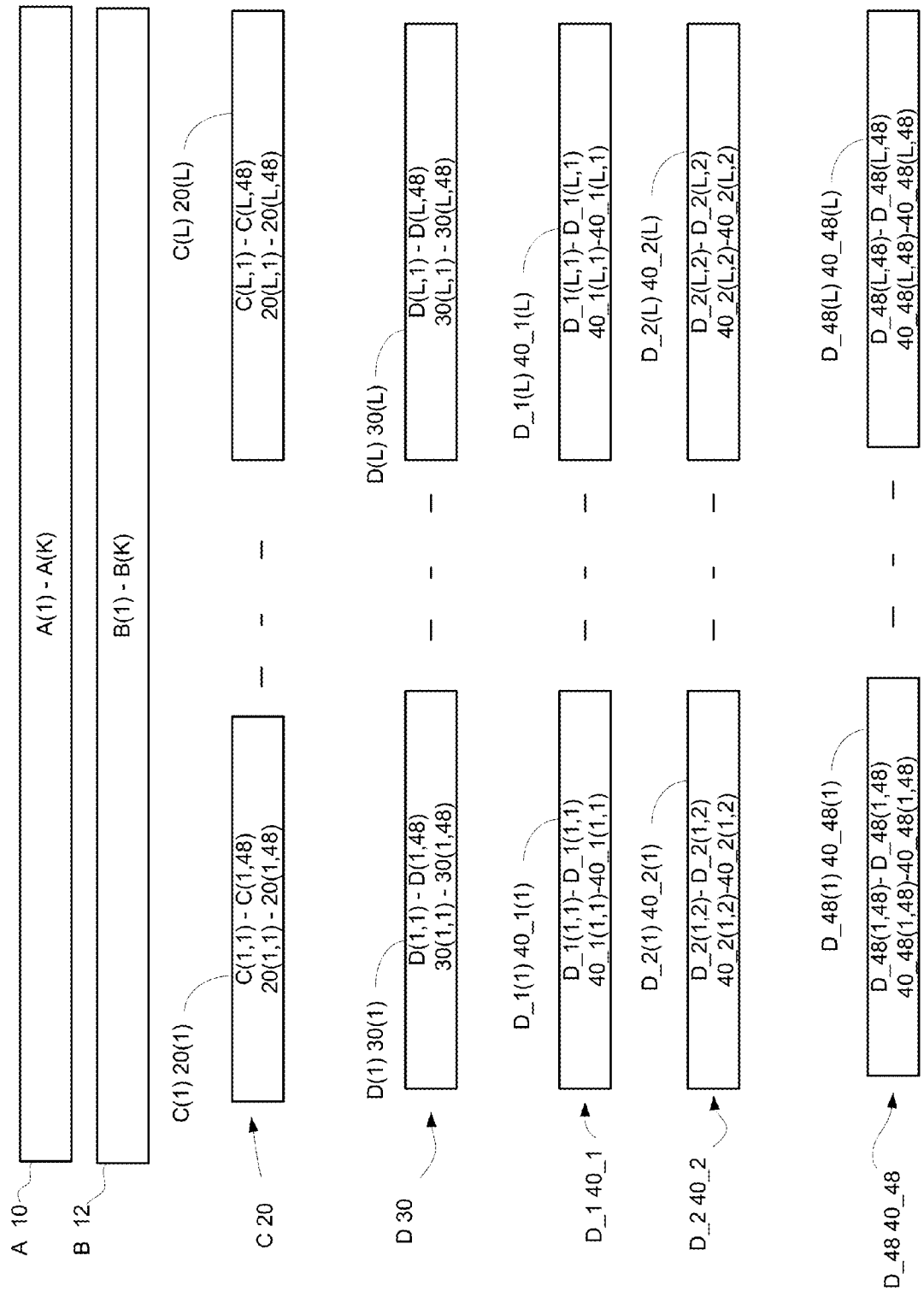
FIG. 2 illustrates various data elements according to an embodiment of the invention.

FIG. 2 illustrates the first information as a vector B 12 that includes K bits B(1)-B(K).

The second information may be converted to an orbit—responsive representation of the second object. In FIG. 1 there is a vector D 30 that includes multiple (L) groups of bits D1 30(1)-D(L) 30(L). L equals K divided by 48.

Each group of vector D includes values of bins that belong to the same orbit under the octahedral group. Different groups include bins that belong to different orbits under the octahedral group.

Vector D is converted to eighty four intermediate representations D_1-D_48 40_1-40_48 of the second object.

Each intermediate representation is orbit responsive and transformation responsive; wherein different intermediate representations correspond to different transformations of the octahedral group.

Each intermediate representation includes L groups of bits. Each group of bits include duplicate of the same bit of vector D.

For index q between 1 and 48 and for index r between 1 and L, the r'th group of the q'th intermediate representation includes forty eight repetitions of the q'th bit of the r'th group of vector D.

For example, L groups of the first intermediate representation includes forty eight repetitions of the first bits of each group of vector D—and the r'th group includes the first bit of the r'th group of vector D.

Yet for another example—L groups of the forty eight intermediate representation includes forty eight repetitions of the forty eighth bits of each group of vector D—and the r'th group includes the forty eighth bit of the r'th group of vector D.

The first group of vector C—is denoted C(1) 20(1) and includes bits C(1,1)-C(1,48) 20(1,1)-20(1,48). The L'th group of vector C—is denoted C(L) 20(L) and includes bits C(L,1)-C(L,48) 20(L,1)-20(L,48).

The first group of vector D—is denoted D(1) 30(1) and includes bits D(1,1)-D(1,48) 30(1,1)-30(1,48). The L'th group of vector C—is denoted D(L) 30(L) and includes bits D(L,1)-D(L,48) 30(L,1)-30(L,48).

The first group of first intermediate representation D_1 40_1—is denoted D_1(1) 40_1(1) and includes bits D_1(1,1)-D_1(1,1) 40_1(1,1)-40_1(1,1)—that equal D(1,1) 30(1, 1). The L'th group of first intermediate representation D_1 40_1—is denoted D_1(L) 40_1(L) and includes bits D_1(L,1)-D_1(L,1) 40_1(L,1)-40_1(L,1)—that equal D(L,1) 30(L, 1).

The first group of second intermediate representation D_2 40_2—is denoted D_2(1) 40_2(1) and includes bits D_2(1,1)-D_2(1,1) 40_2(1,1)-40_2(1,1)—that equal D(1,2) 30(1, 2). The L'th group of first intermediate representation D_2 40_2—is denoted D_2(L) 40_2(L) and includes bits D_2(L,1)-D_2(L,1) 40_2(L,1)-40_2(L,1)—that equal D(L,2) 30(L, 2).

The first group of the forty eighth intermediate representation D_48 40_48—is denoted D_48(1) 40_48(1) and includes bits D_48(1,1)-D_48(1,1) 40_48(1,1)-40_48(1, 1)—that equal D(1,48) 30(1,48). The L'th group of the forty eighth intermediate representation D_48 40_48—is denoted D_48(L) 40_48(L) and includes bits D_48(L,1)-D_48(L,1) 40_48(L,1)-40_48(L,1)—that equal D(L,48) 30(L,48).

Figure 3:
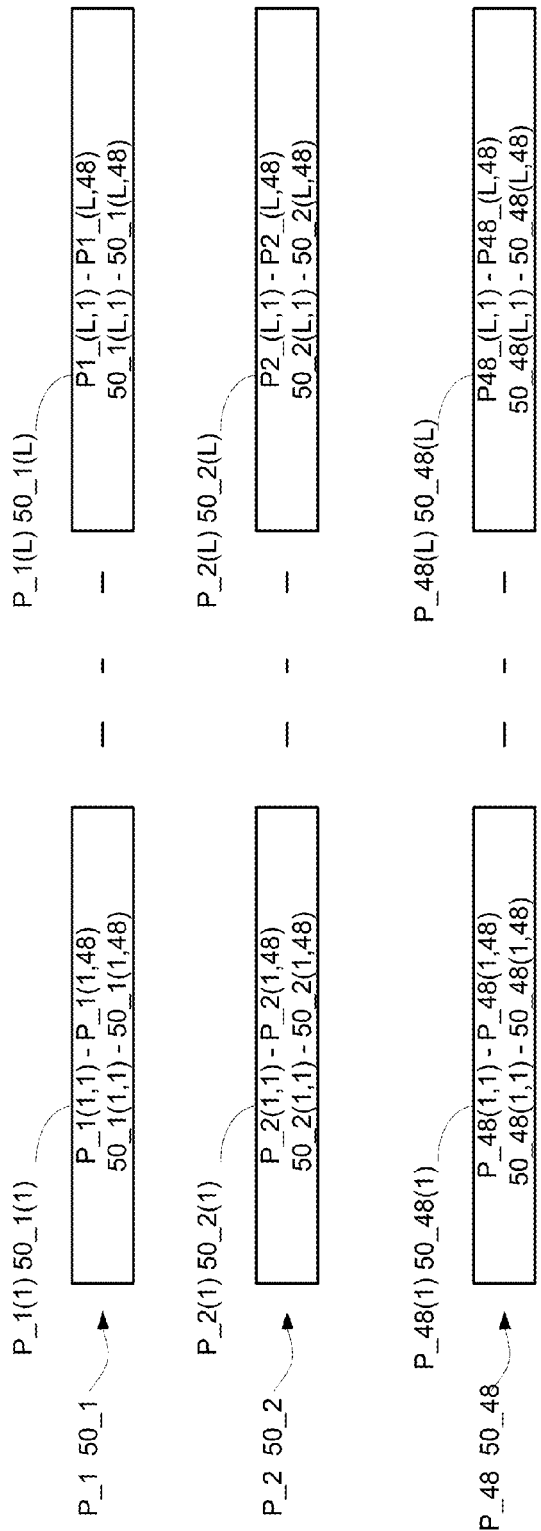
FIG. 3 illustrates various data elements according to an embodiment of the invention.

FIG. 3 illustrates multiple intermediate results according to an embodiment of the invention.

There are forty eight intermediate results P_1-P_48 50_1-50_48.

The intermediate results are calculated by performing a logical AND operation between the orbit—responsive representation of the first object (vector C 20) and each one of the intermediate representations D1_1-D_48 40_1-40_48.

For example P_1=C AND D_1, P_2=C AND D_2, P_48=C AND D_48. For each value of q between 1 and 48 P_r=C AND P_r.

Each intermediate result includes L intermediate result groups.

In FIG. 3 the first group of first intermediate result P_1 50_1—is denoted P_1(1) 50_1(1) and includes bits P_1(1, 1)-P_1(1,48) 50_1(1,1)-50_1(1,48). The L'th group of first intermediate result P_1 50_1—is denoted P_1(L) 50_1(L) and includes bits P_1(L,1)-P_1(L,48) 50_1(L,1)-50_1(L, 48).

The first group of second intermediate result P_2 50_2—is denoted P_2(1) 50_2(1) and includes bits P_2(1,1)-P_2 (1,48) 50_2(1,1)-50_2(1,48). The L'th group of second intermediate result P_2 50_2—is denoted P_2(L) 50_2(L) and includes bits P_2(L,1)-P_2(L,48) 50_2(L,1)-50_2(L, 48).

The first group of forty eighth intermediate result P_48 50_48—is denoted P_48(1) 50_48(1) and includes bits P_48(1,1)-P_48(1,48) 50_48(1,1)-50_48(1,48). The L'th group of forty eighth intermediate result P_48 50_48—is denoted P_48(L) 50_48(L) and includes bits P_48(L,1)-P_48(L,48) 50_48(L,1)-50_48(L,48).

In order to perform this evaluation each one of the forty eights intermediate results should be converted to eighty four sums—wherein the q'th sum is the sum of the q'th bits of each one of the L groups of the of the intermediate result—each sum corresponds to a different combination of transformations.

For example—referring to the first intermediate result P_1 50_1—the first sum equals P_1(1,1)+P_1(2,1)+ . . . +P_1 (L,1); the second sum equals P_1(1,2)+P_1(2,2)+ . . . +P_1(L,2), the third sum equals P_1(1,3)+P_1(2,3)+ . . . +P_1(L,3), the q'th sum equals P_1(1,q)+P_1(2,q)+ . . . +P_1(L,q) and the forty eighth sum equals P_1(1,48)+P_1 (2,48)+ . . . +P_1(L,48).

Figure 4:
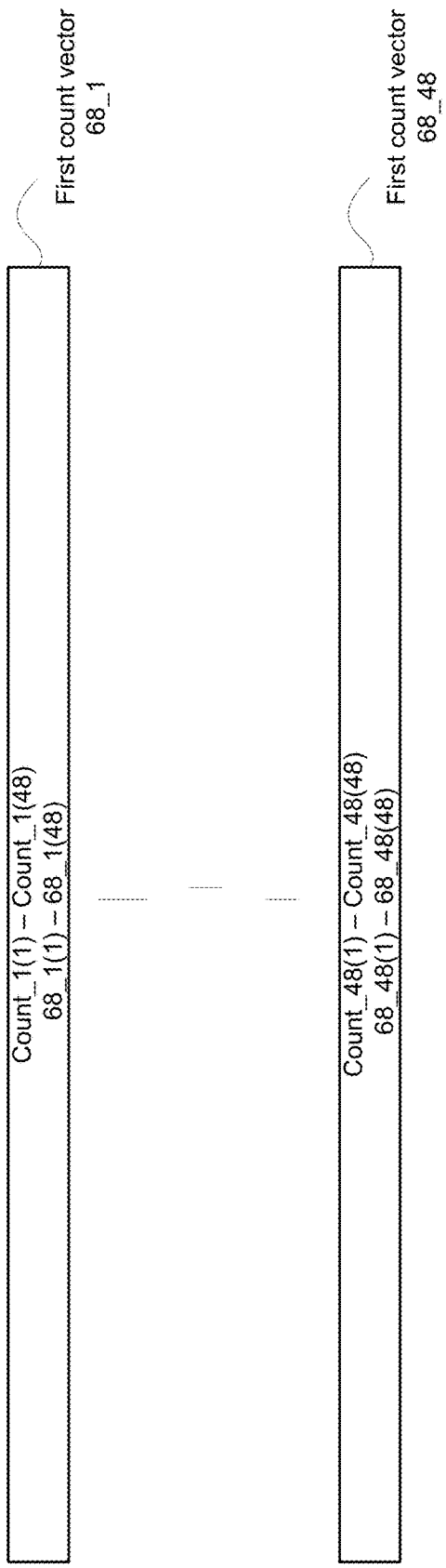
FIG. 4 illustrates various data elements according to an embodiment of the invention.
Figure 5:
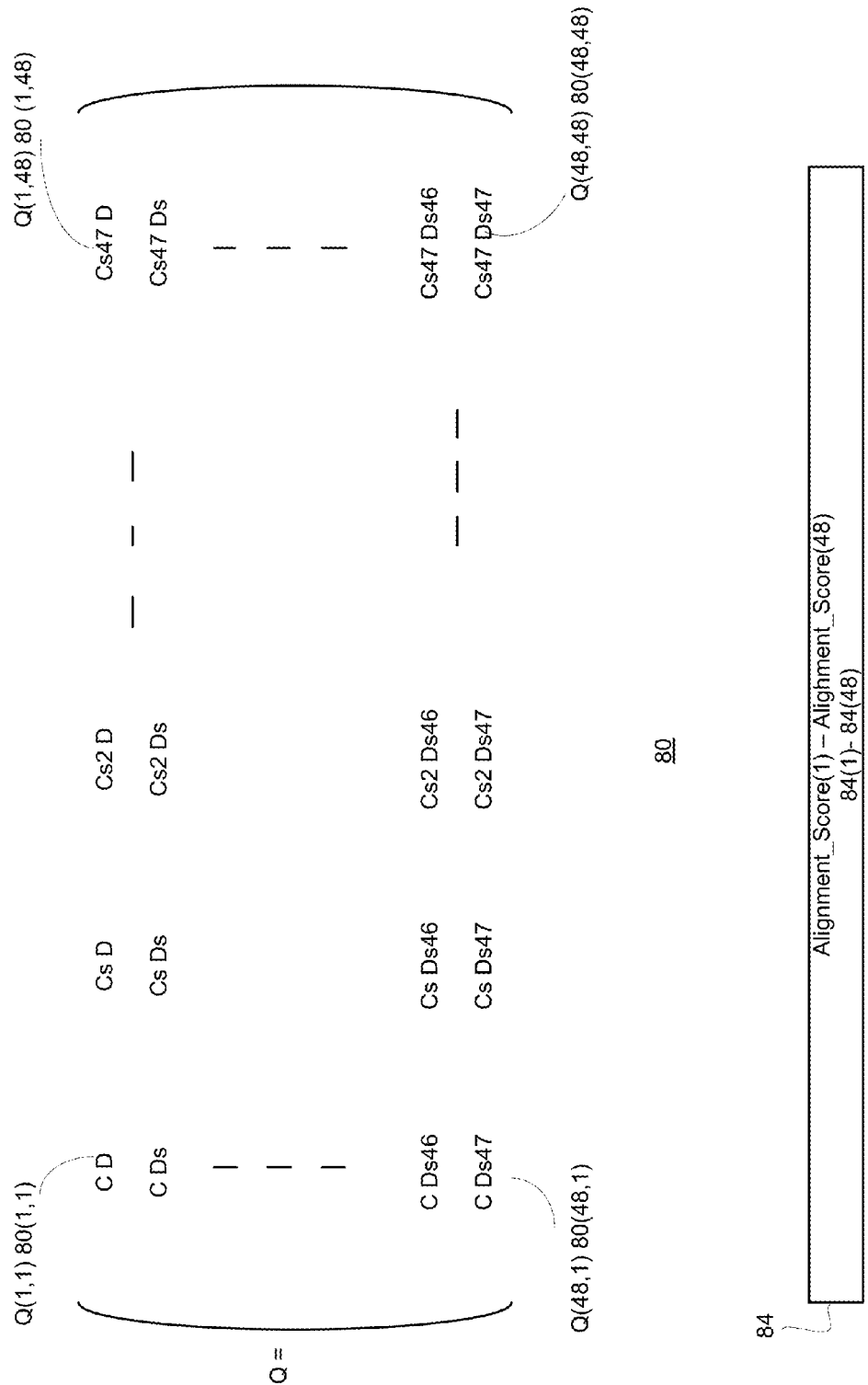
FIG. 5 illustrates various data elements according to an embodiment of the invention.

FIG. 4 illustrates forty eight count vectors. The first count vector 68_1 includes forty eight counts Count_1(1)-Count_1 (48) 68_1(1)-68_1(48) that are associated with the first intermediate result P_1 50_1. The forty eight count vector 68_1 includes forty eight counts Count_48(1)-Count_48(48) 68_48(1)-68_48(48) that are associated with the forty eighth intermediate result P_48 50_48.

The forty eight by forty eight sums associated with the forty eight intermediate results correspond to the 2304 combinations mentioned above.

The 2304 combinations represent forty eight spatial relationships between the first and second objects. For example—when both the first and second objects are transformed by the same transformation—the spatial relationship between the first and second objects remains the same.

Figure 7:
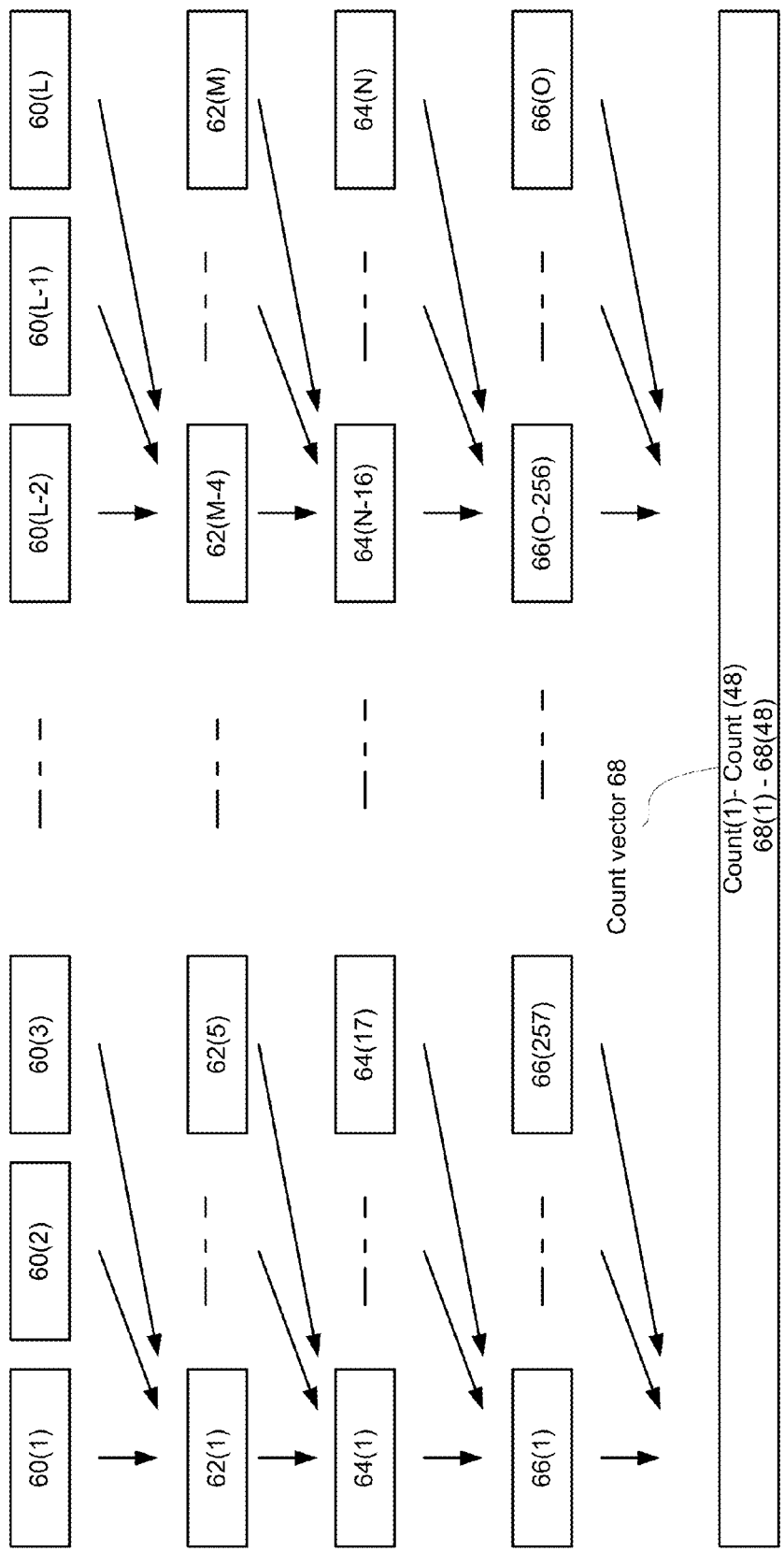
FIG. 7 illustrates various data elements according to an embodiment of the invention.

FIG. 7 illustrates a 48×48 matrix 80 that has 2304 elements Q(1,1) 80(1,1)-Q(48,48) 80(48,48) that represent the 2034 combinations.

In FIG. 7 the letter s refers to the second transformation of the octahedral group and the letter s followed by a number represents the (number+1)'th transformation of the octahedral group. For example—element "C D" indicates that the first object is being transformed by the first transformation and that the second object is being transformed by the first transformation. Yet for another example "Cs2 D" indicates that the first object is being transformed by the third transformation and that the second object is being transformed by the first transformation.

The matrix Q 80 indicates which sums should be added to each other—and these sums represent the same spatial relationship between the first and second objects.

After summing the sums according to the information stored in matrix Q 80 there are forty eight scores Alignment_Score(1)-Alignment_Score 84(1)-84(48) (collectively denoted 84)—the highest score represents the best alignment—the octahedral transform that once applied on the PCA aligned first object—will provide the best alignment between the first and second objects.

According to an embodiment of the invention the calculation of the sums is perform in a highly efficient manner that is referred to as "conquer and divide" method that is illustrated in Hacker's Delight, Second Edition, Henry S. Warren, Addison-Wesley, 25 Sep. 2012. In a nut shell—instead of counting the number of bits in a L vector (includes bits of the same position within the different groups of the intermediate result)—an iterative process is applied in which vectors are converted to odd and even vectors by replacing in an interleaved manner, odd or even sets of bits by zeros and adding multiple odd vectors to each other and multiple even vectors to each other. During the x'th iteration each set of zero bits includes a sequence of two by the power of (x−1) zero bits, (two by the power of two by the power of (x−1)) odd vectors are added to each other (two by the power of two by the power of (x−1)) even vectors are added to each other.

After some iterations there is provided a sums vector that includes forty eight elements that represent the forty eight sums.

Figure 6:
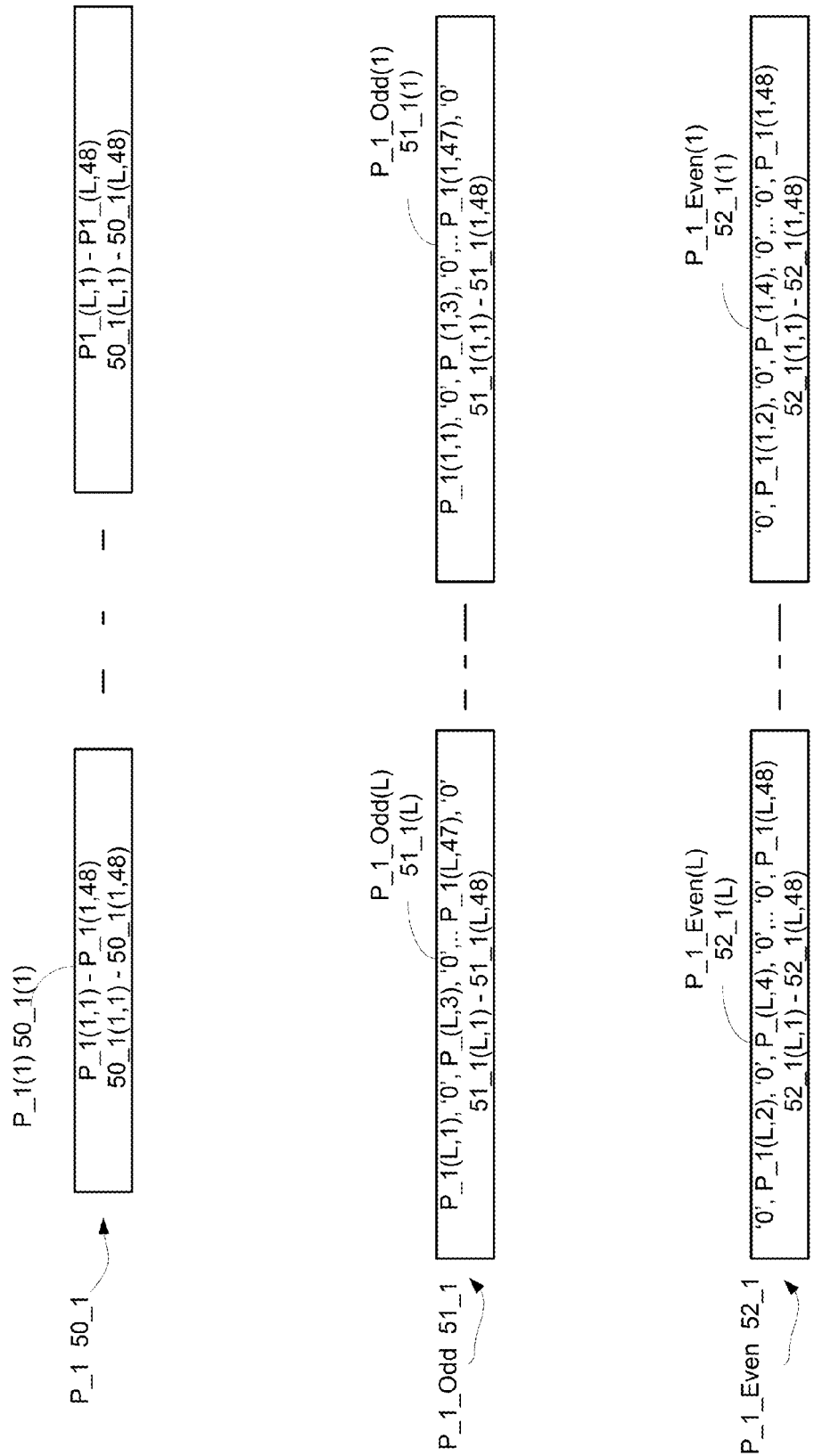
FIG. 6 illustrates various data elements according to an embodiment of the invention.

FIG. 6 illustrates the conversion of first intermediate result 50_1 to odd and even vectors P_1_Odd 51_1 and P_1_Even 52_1.

This is the first conversion (first iteration) of an iterative process. The number of iterations is determined based on the number of groups (L) of each the intermediate result.

The first intermediate result P1_1 50_1 includes L groups—out of which (for brevity of explanation) FIG. 6 illustrates the first group P1_1(1) 50_1(1) and the last group P1_1(L) 50_1(L).

The first intermediate result P1_1 50_1 is converted to an odd vector P_1_Odd 51_1 and to an even vector P_1_Even 52_1. The odd vector P_1_Odd 51_1 is calculated by replacing the odd bits of the first intermediate result P1_1 50_1 by zeros. The even vector P_1_Even 52_1 is calculated by replacing the even bits of the first intermediate result P1_1 50_1 by zeros.

In FIG. 6 the first and last groups of the even and odd vectors are shown—P_1_Odd(1) 51_1(1), P_1_Odd(L) 51_1(L), P_1_Even(1) 52_1(1), P_1_Even(L) 52_1(L)—as well as various bits (P_1(1,2), P_1(1,4), P_1(1,48), P_L(1, 2), P_L(1,4), P_L(1,48), P_1(1,1), P_1(1,3), P_1(1,47), P_L (1,1), P_L(1,3), P_L(1,47)) and zeros ('0').

FIG. 7 illustrates the conversion of first intermediate result 50_1 to count vector 68 by four iterations.

During the first iteration groups (60(1)-60(L)) of the first intermediate results are converted to odd vectors and even vectors. Sets of three odd vectors are added to each other. Sets of three even vectors are added to each other.

Odd vectors generated from groups 60(1), 60(2) and 60(3) are added to each other to provide a second level vector. Odd vectors generated from groups 60(L−2), 60(L−1) and 60(L) are added to each other to provide a second level vector.

Even vectors generated from groups 60(1), 60(2) and 60(3) are added to each other to provide a second level vector. Even vectors generated from groups 60(L−2), 60(L−1) and 60(L) are added to each other to provide a second level vector.

During the second iteration second level vectors (62(1)-62(M)) are converted to odd vectors and even vectors. Sets of five odd vectors are added to each other. Sets of five even vectors are added to each other. The conversion includes replacing even or odd pairs of bits by a pair of zeros. The pairs of zeros are spaced apart by two unchanged bits from the second level vectors.

Odd vectors generated from second level vectors 62(1)-62(5) are added to each other to provide a third level vector. Odd vectors generated from second level vectors 62(M−2)-62(M) are added to each other to provide a third level vector.

Even vectors generated from second level vectors 62(1)-62(5) are added to each other to provide a third level vector. Even vectors generated from second level vectors 62(M−2)-62(M) are added to each other to provide a third level vector.

During the third iteration third level vectors (64(1)-62(N)) are converted to odd vectors and even vectors. Sets of seventeen odd vectors are added to each other. Sets of seventeen even vectors are added to each other. The conversion includes replacing even or odd sequences of four bits by four zeros. The sequences of four zeros are spaced apart by four unchanged bits from the third level vectors.

Odd vectors generated from third level vectors 64(1)-62 (17) are added to each other to provide a fourth level vector.

Odd vectors generated from third level vectors 64(N−16)-64(N) are added to each other to provide a fourth level vector.

Even vectors generated from third level vectors 64(1)-62(17) are added to each other to provide a fourth level vector. Even vectors generated from third level vectors 64(N−16)-64(N) are added to each other to provide a fourth level vector.

During the fourth iteration fourth level vectors (66(1)-66(O)) are converted to odd vectors and even vectors. Sets of 257 odd vectors are added to each other. Sets of 257 even vectors are added to each other. The conversion includes replacing even or odd sequences of eight bits by eight zeros. The sequences of eight zeros are spaced apart by eight unchanged bits from the fourth level vectors.

Odd vectors generated from fourth level vectors 66(1)-62(257) are added to each other to provide a fifth level vector. Odd vectors generated from fourth level vectors 66(O−256)-66(O) are added to each other to provide a fifth level vector that is count vector 68.

Figure 8:
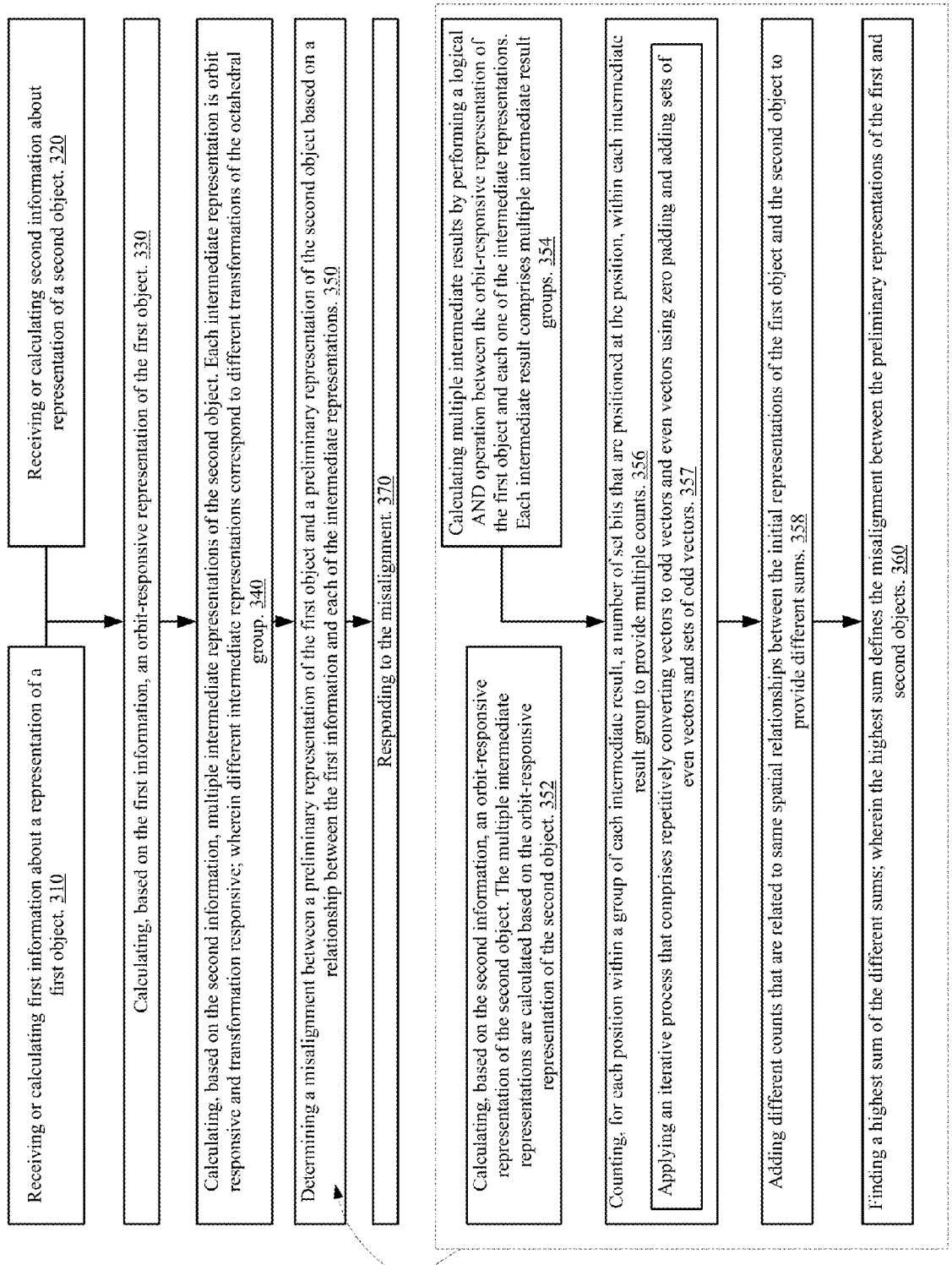
FIG. 8 illustrates a method according to an embodiment of the invention.

FIG. 8 illustrates method 300 according to an embodiment of the invention.

Method 300 may start by steps 310 and 320.

Step 310 may include receiving or calculating first information about a representation of a first object. The representation of the first object may be a principal component analysis (PCA) aligned representation of the first object, any other coordinate axis aligned representation of the first object or a non-aligned representation of the first object. The representation may be a preliminary representation of the first object—before applying any other alignment process.

Step 320 may include receiving or calculating second information about a representation of a second object.

Step 320 may include receiving or calculating second information about a representation of a second object. The representation of the second object may be a principal component analysis (PCA) aligned representation of the second object, any other coordinate axis aligned representation of the second object or a non-aligned representation of the second object. The representation may be a preliminary representation of the second object—before applying any other alignment process.

Step 310 may be followed by step 330 of calculating, based on the first information, an orbit-responsive representation of the first object.

Step 320 may be followed by step 340 of calculating, based on the second information, multiple intermediate representations of the second object. Each intermediate representation is orbit responsive and transformation responsive; wherein different intermediate representations correspond to different transformations of the octahedral group.

Steps 330 and 340 may be followed by step 350 of determining a misalignment between a preliminary representation of the first object and a preliminary representation of the second object based on a relationship between the first information and each of the intermediate representations.

The misalignment may correspond to the best alignment between the first and second objects. The best alignment is selected out of multiple possible alignments that correspond to forty eight transforms of the octahedral group when applied on the first object and to the forty eight transforms of the octahedral group when applied on the second object—to the best alignment out of the 2034 possibilities.

Step 350 may include step 352 of calculating, based on the second information, an orbit-responsive representation of the second object. The multiple intermediate representations are calculated based on the orbit-responsive representation of the second object.

Each intermediate representation comprises multiple repetitions of bits that are positioned at a same position within different groups of the orbit-responsive representation of the second object. Different intermediate representations may include bits that were positioned at different locations of the orbit-responsive representation of the second object.

Step 350 may also include step 354 of calculating multiple intermediate results by performing a logical AND operation between the orbit-responsive representation of the first object and each one of the intermediate representations. Each intermediate result comprises multiple intermediate result groups.

Step 354 may be followed by step 356 of counting, for each position within a group of each intermediate result, a number of set bits that are positioned at the position, within each intermediate result group to provide multiple counts.

Step 356 may include applying (357) an iterative process that comprises repetitively converting vectors to odd vectors and even vectors using zero padding and adding sets of even vectors and sets of odd vectors. See, for example, FIGS. 6 and 7.

Step 356 may be followed by step 358 of adding different counts that are related to same spatial relationships between the initial representations of the first object and the second object to provide different sums.

Step 358 may be followed by step 360 of finding a highest sum of the different sums; wherein the highest sum defines the misalignment between the preliminary representations of the first and second objects.

Step 350 may be followed by step 370 responding to the misalignment. Step 360 may include at least one of the following:

a. Comparing between the representations of the first and second object after aligning the representations of the first and second objects to each other. The comparison may be part of the process of finding, out of group of objects, the best matching object to the first object.

b. Printing (or sending instructions to a three dimensional printer that once executed by the three dimensional printer will cause the three dimensional printer to print) one or more of the representations of the first object and/or and second objects by a three dimensional printer.

c. Replacing a file that stores the representation of the first and/or second object by another file that stores the aligned representation of the object, and the like. This replacement may save memory space. The aligned representation may be used in further comparisons to other objects.

Method 300 is a highly efficient and fast—as it does not involve applying all of the transformations of the octahedral group on both the PCA aligned representation of the first and second object. Method 200 is also easy to compile and debug. Using a fast process for counting the set bits further speeds up the process. Instead of computing and maybe storing multiple rotated representations of the objects that correspond to the 2034 combination of transformations method 300 calculates only a small subset of the results and thus saves memory and reduces the computational load associated with the calculation of misalignment.

FIG. 9 illustrates the system 500 as being coupled to a three dimensional printer 510 and a network 520.

The system 500 may be a computer such as a laptop, a desktop, a server, a mobile phone, a personal data assistant, a media player, or any system that may execute programs and communicate with other devices. The system 500 may be directly or indirectly accessed by a user. For example, the system 500 may be a server that can communicate with a user device that differs from system 500. Alternatively, the system may be a user device that includes a man machine interface (keyboard, screen, touch screen, mouse, voice activation interface, and the like). In the latter scenario the user device may be arranged to execute an application that allows the user to benefit from the computerized services of system 500.

Network 520 may be a wired network, wireless network, a combination of wired and wireless networks, a local area network, a wide area network, the Internet and the like.

Method 300 may be executed by a system 500 that includes a processor 502 and a memory module 504. The processor may be a general purpose processor, a digital signal processor or a dedicated hardware arranged to perform the processing illustrated in the patent application.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method, comprising:
   receiving or calculating first information about a representation of a first object;
   receiving or calculating second information about a representation of a second object;
   calculating, based on the first information, an orbit-responsive representation of the first object;
   calculating, based on the second information, multiple intermediate representations of the second object; wherein each intermediate representation is orbit responsive and transformation responsive; wherein different intermediate representations correspond to different transformations of the octahedral group; and
   determining a misalignment between a preliminary representation of the first object and a preliminary representation of the second object based on a relationship between the first information and each of the intermediate representations; wherein the determining of the misalignment between the preliminary representation of the first object and the preliminary representation of the second object comprises:
   calculating multiple intermediate results by performing a logical AND operation between the orbit-responsive representation of the first object and each one of the intermediate representations; wherein each intermediate result comprises multiple intermediate result groups;
   for each position counting a number of set bits that are positioned at the position, within each intermediate result group to provide multiple counts;
   adding different counts that are related to same spatial relationships between the initial representations of the first object and the second object to provide different sums; and
   finding a highest sum of the different sums; wherein the highest sum defines the misalignment between the preliminary representations of the first and second objects.

2. The method according to claim 1 comprising calculating, based on the second information, an orbit-responsive representation of the second object; wherein the multiple intermediate representations are calculated based on the orbit-responsive representation of the second object.

3. The method according to claim 2, wherein each intermediate representation comprises multiple repetitions of bits that are positioned at a same position within different groups of the orbit-responsive representation of the second object; and wherein different intermediate representations include bits that were positioned at different locations of the orbit-responsive representation of the second object.

4. The method according to claim 1 wherein the counting of the number of the set bits that are positioned at the position comprises applying an iterative process that comprises repetitively converting vectors to odd vectors and even vectors using zero padding; and adding sets of even vectors and sets of odd vectors.

5. The method according to claim 1 wherein the first information is about a principal component analysis (PCA) aligned representation of the first object and wherein the second information is about a PCA aligned representation of the second object.

6. A non-transitory computer readable medium, that stores instructions for:
   receiving or calculating first information about a representation of a first object;
   receiving or calculating second information about a representation of a second object;
   calculating, based on the first information, an orbit-responsive representation of the first object;
   calculating, based on the second information, multiple intermediate representations of the second object; wherein each intermediate representation is orbit responsive and transformation responsive; wherein different intermediate representations correspond to different transformations of the octahedral group; and
   determining a misalignment between a preliminary representation of the first object and a preliminary representation of the second object based on a relationship between the first information and each of the intermediate representations; wherein the determining of the misalignment between the preliminary representation of the first object and the preliminary representation of the second object comprises:
   calculating multiple intermediate results by performing a logical AND operation between the orbit-responsive representation of the first object and each one of the intermediate representations; wherein each intermediate result comprises multiple intermediate result groups;
   for each position counting a number of set bits that are positioned at the position, within each intermediate result group to provide multiple counts;
   adding different counts that are related to same spatial relationships between the initial representations of the first object and the second object to provide different sums; and finding a highest sum of the different sums; wherein the highest sum defines the misalignment between the preliminary representations of the first and second objects.

7. The non-transitory computer readable medium according to claim 6 that stores instructions for calculating, based on the second information, an orbit-responsive representation of the second object; wherein the multiple intermediate representations are calculated based on the orbit-responsive representation of the second object.

8. The non-transitory computer readable medium according to claim 7, wherein each intermediate representation comprises multiple repetitions of bits that are positioned at a same position within different groups of the orbit-responsive representation of the second object; and wherein different intermediate representations include bits that were positioned at different locations of the orbit-responsive representation of the second object.

9. The non-transitory computer readable medium according to claim 6 wherein the counting of the number of the set bits that are positioned at the position comprises applying an iterative process that comprises repetitively converting vectors to odd vectors and even vectors using zero padding; and adding sets of even vectors and sets of odd vectors.

10. The non-transitory computer readable medium according to claim 6 wherein the first information is about a principal component analysis (PCA) aligned representation of the first object and wherein the second information is about a PCA aligned representation of the second object.

11. A computer, comprising:
a memory unit that is configured to store first information about a representation of a first object and to store second information about a representation of a second object;
a processor that is configured to:
calculate, based on the first information, an orbit-responsive representation of the first object;
calculate, based on the second information, multiple intermediate representations of the second object; wherein each intermediate representation is orbit responsive and transformation responsive; wherein different intermediate representations correspond to different transformations of the octahedral group; and
determine a misalignment between a preliminary representation of the first object and a preliminary representation of the second object based on a relationship between the first information and each of the intermediate representations, by:
calculating multiple intermediate results by performing a logical AND operation between the orbit-responsive representation of the first object and each one of the intermediate representations; wherein each intermediate result comprises multiple intermediate result groups;
for each position counting a number of set bits that are positioned at the position, within each intermediate result group to provide multiple counts:
adding different counts that are related to same spatial relationships between the initial representations of the first object and the second object to provide different sums; and
finding a highest sum of the different sums; wherein the highest sum defines the misalignment between the preliminary representations of the first and second objects.

12. The computer according to claim 11 wherein the processor is configured to calculate, based on the second information, an orbit-responsive representation of the second object; wherein the multiple intermediate representations are calculated based on the orbit-responsive representation of the second object.

13. The computer according to claim 12, wherein each intermediate representation comprises multiple repetitions of bits that are positioned at a same position within different groups of the orbit-responsive representation of the second object; and wherein different intermediate representations include bits that were positioned at different locations of the orbit-responsive representation of the second object.

14. The computer according to claim 11 wherein the processor is configured to the count the number of the set bits that are positioned at the position by applying an iterative process that comprises repetitively converting vectors to odd vectors and even vectors using zero padding; and adding sets of even vectors and sets of odd vectors.

15. The computer according to claim 11 wherein the first information is about a principal component analysis (PCA) aligned representation of the first object and wherein the second information is about a PCA aligned representation of the second object.

* * * * *